United States Patent [19]
Suzuki et al.

[11] Patent Number: 5,103,642
[45] Date of Patent: Apr. 14, 1992

[54] ROTARY SHAFT COUPLER WITH ROTARY VALVE PLATE POSITION DEPENDENT ON DIRECTION OF SHAFT ROTATION

[75] Inventors: Satoru Suzuki; Hideaki Ina, both of Kosai; Takehisa Yamada, Maisaka, all of Japan

[73] Assignee: Fuji Tekko Co., Ltd., Shizuoka, Japan

[21] Appl. No.: 671,925

[22] Filed: Mar. 20, 1991

[30] Foreign Application Priority Data

| Jul. 12, 1990 | [JP] | Japan | 2-184735 |
| Jul. 12, 1990 | [JP] | Japan | 2-184737 |
| Jul. 13, 1990 | [JP] | Japan | 2-74478 |

[51] Int. Cl.⁵ ............... F04B 21/00; F16D 25/06
[52] U.S. Cl. .................. 60/413; 91/485; 192/59
[58] Field of Search .......... 60/487, 489, 413; 91/499, 485; 192/59, 60, 103 F

[56] References Cited

U.S. PATENT DOCUMENTS

| 1,913,003 | 6/1933 | Shaff | 91/499 X |
| 2,511,518 | 6/1950 | Stephens . | |
| 2,525,498 | 10/1950 | Naylor et al. | 91/485 |
| 2,691,868 | 10/1954 | Nicolas | 60/413 |
| 2,808,739 | 10/1957 | Mueller . | |
| 2,827,859 | 3/1958 | Crane | 91/485 |
| 2,861,477 | 11/1958 | Mueller . | |
| 2,915,974 | 12/1959 | Enemark | 91/499 X |
| 3,155,010 | 11/1964 | Johnson et al. | 91/485 |
| 3,230,795 | 1/1966 | Mueller . | |
| 3,393,583 | 7/1968 | Mueller . | |
| 3,468,263 | 9/1969 | Niemiec | 91/499 |
| 3,488,980 | 1/1970 | Burrough | 192/59 X |
| 3,495,477 | 2/1970 | Mueller . | |
| 3,577,803 | 5/1971 | Mueller . | |
| 3,585,901 | 6/1971 | Moon, Jr. et al. | 91/499 X |
| 3,664,474 | 5/1972 | Blake et al. | 192/59 X |
| 3,699,845 | 10/1972 | Ifield | 91/499 X |
| 3,831,461 | 8/1974 | Mueller | 192/60 X |
| 3,890,883 | 6/1975 | Rometsch et al. | 91/499 |
| 4,034,652 | 7/1977 | Huebner | 91/499 |
| 4,387,795 | 6/1983 | Mueller . | |
| 4,578,948 | 4/1981 | Hutson et al. | 60/487 |
| 4,676,336 | 6/1987 | Hiramatsu et al. . | |
| 4,719,998 | 1/1988 | Hiramatsu et al. . | |
| 4,770,651 | 9/1988 | Friedrich | 464/27 |
| 4,776,257 | 10/1988 | Hansen | 91/499 X |
| 4,934,251 | 6/1990 | Barker | 91/499 X |

FOREIGN PATENT DOCUMENTS

| 0301310 | 2/1989 | European Pat. Off. | 91/499 |
| 0992809 | 1/1983 | U.S.S.R. | 91/499 |
| 0405429 | 2/1934 | United Kingdom | 192/59 |

Primary Examiner—Edward K. Look
Assistant Examiner—John Ryznic
Attorney, Agent, or Firm—Wenderoth, Lind & Ponack

[57] ABSTRACT

Two rotary shafts to transfer a motive power are relatively rotatably coupled. One of the shafts is coupled to a rotor and the other is coupled to a cam. A plurality of plungers which execute a stroke motion in the axial direction by the relative rotation with the cam are provided for the rotor. The oil injection and discharge into/from the plunger enclosing chamber are executed by a rotary valve. The rotary valve automatically switches a phase relation so as to obtain correct opening/closing timings even if the direction of the relative rotation changed. The rotary valve rotates integratedly with the cam side and opens or closes intake/discharge holes of the plungers for a plurality of intake ports and discharge ports which are alternately formed on the cam surface. The discharge ports on the front surface of the rotary valve are mutually coupled by communicating grooves formed on the back surface. An orifice is formed between the communicating groove and the intake port. A force by hydraulic reaction forces of the front and back surfaces of the rotary valve is set to be smaller than a force by a plunger liquid pressure acting area which is applied to the rotary valve. Thus, a force such as to always closely adhere a gap between the rotor and the rotary valve is generated, thereby minimizing an oil leakage from the rotary valve.

11 Claims, 17 Drawing Sheets

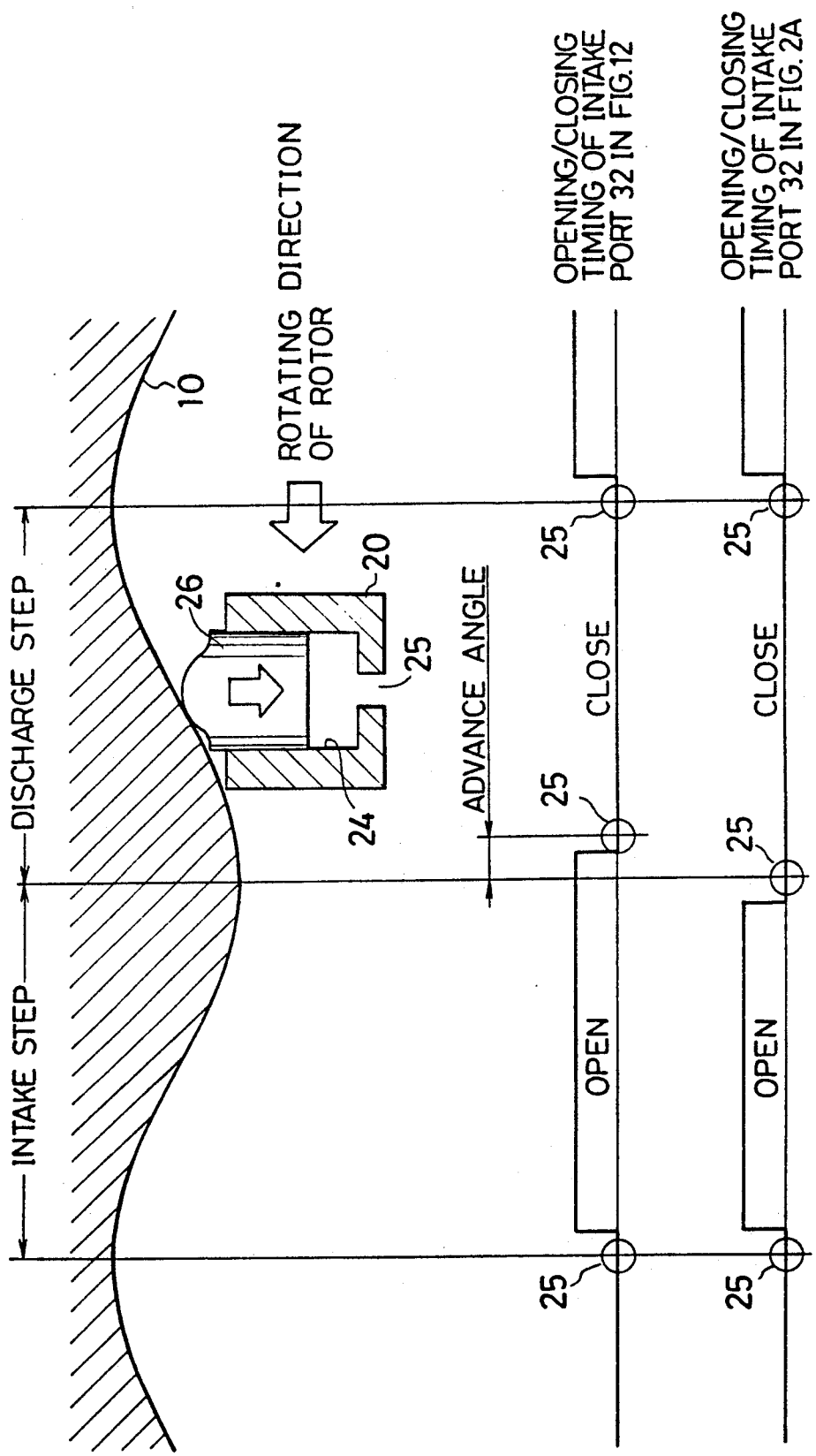

ROTARY SHAFT COUPLER WITH ROTARY VALVE PLATE POSITION DEPENDENT ON DIRECTION OF SHAFT ROTATION

BACKGROUND OF THE INVENTION

The present invention relates to a hydraulic power transmission joint which is used to distribute a driving force of a vehicle and, more particularly, to a hydraulic power transmission apparatus which relatively rotatably couples two power rotary shafts and transfers a torque corresponding to a difference between the rotational speeds.

Hitherto, as a method of distributing the motive power to front and rear wheels in a four-wheel driving car or distributing the motive power to right and left driving wheels, there has been known a method using a plunger pump mechanism as disclosed in, for instance, U.S. Pat. No. 3,393,583 or U.S. Pat. No. 2,511,518.

However, such a plunger pump mechanism has a structure in which a plurality of plungers are arranged in the radial direction and a liquid pressure is generated by a stroke of the plunger in association with the relative rotation between a cam housing and a rotor. Thus, there are problems such that a cooling efficiency is low, a vibration is large, and an assembling performance is also bad.

Therefore, in U.S. Application Ser. No. 07/461,124, now U.S. Pat. No. 5,037,353, the inventors of the present invention have proposed a hydraulic power transmission joint having a structure such that a plunger is stroked in the direction which is parallel with a shaft in association with the relative rotation between a cam housing and a rotor and a liquid pressure to transfer a torque is generated.

However, in such a conventional hydraulic power transmission joint, since check valves are used as an intake valve and a discharge valve, there is a problem such that a centrifugal force due to the rotation of the joint itself acts on the check valves and the check valves are not closed due to the centrifugal force. It is difficult to realize a joint which correctly functions even in the rotation of a high speed.

On the other hand, in a plunger pump for use in a general industry, a rotary valve is hitherto used. However, the following problems occur in the case of using the rotary valve in a power transmission joint for use in a 4-wheel driving car.

That is, in the conventional rotary valve for use in the general industry, opening/closing phases of the cam to drive the plunger and the valve are fixed and when the rotating direction changes, the relation between the intake and discharge operations for the cam is reversed and the flowing direction of an oil is also reversed. When the flowing direction of the oil is reversed, the discharge oil from a plunger chamber flows to the intake valve side having no orifice, so that no pressure is generated in the plunger chamber and no torque is generated. Consequently, different from the general industrial pump which is used by fixing the rotating direction, the conventional rotary valve cannot be directly used in the power distributing apparatus for use in the 4-wheel driving car in which the differential rotating direction changes such as in the case of the forward and backward movements or the acceleration and deceleration modes.

On the other hand, the rotary valve has a problem such that a force in such a direction as to open a gap of the valve is generated depending on the relation between the liquid pressure and its reaction force and an oil leakage increases so long as a port area of the valve surface is not properly determined.

Further, in the hydraulic power transmission joint using the plunger pump, since the oil is discharged by the reciprocating motion of each plunger, if an air mixedly exists in the operating oil, a volume change of each cylinder is absorbed by the compression of the air and the power transmitting function cannot be effected. Therefore, when the oil is injected into the joint, it is necessary to fill the oil by completely bleeding the air.

There is a method of assembling the parts of the joint in the oil in order to prevent the mixture of the air or the like. However, since the assembling method is difficult or the like, hitherto, two oil injection holes are formed in the central portion of the joint shaft edge and the oil is fed with a pressure from one direction and is discharged from the other direction while giving a differential pressure to the joint, thereby bleeding the internal air.

However, there is a problem such that if the oil injection holes which are closed by screwing tapered plugs after completion of the oil injection are formed in the housing, an outer diameter increases by only an amount of such holes. It is demanded to form the oil injection holes to proper positions such as not to increase the joint.

SUMMARY OF THE INVENTION

It is an object of the invention to provide a hydraulic power transmission joint in which a rotary valve is used as an intake valve and a discharge valve and the valve function is not essentially influenced by a centrifugal force due to the rotation of the joint.

Another object of the invention is to provide a hydraulic power transmission joint in which a rotary valve is used as an intake valve and a discharge valve and the number of parts is reduced, thereby making the working and assembling operations easy.

Still another object of the invention is to provide a hydraulic power transmission joint using a rotary valve having a structure such that the functions as an intake valve and a discharge valve can be effectively used even if the rotating direction changes.

Further another object of the invention is to provide a hydraulic power transmission joint having a rotary valve structure which prevents local abrasions of a cam and a plunger and has a switching timing such that the plunger doesn't rotate even if a rotation preventing mechanism is not used.

Further another object of the invention is to provide a hydraulic power transmission joint which can minimize an oil leakage of the rotary valve portion.

Further another object of the invention is to provide a hydraulic power transmission joint which is small, light-weighted, and cheap and has a high durability and a high reliability.

Further another object of the invention is to provide a hydraulic power transmission joint which can inject an oil and can bleed the air without increasing the size.

That is, a hydraulic power transmission joint according to the invention comprises: a cam housing which is coupled to one of relatively rotatable input and output shafts and in which a cam surface having two or more mountains is formed on an inside surface; a rotor which is coupled to the other one of the input and output shafts and is rotatably enclosed in the cam housing and in which a plurality of plunger chambers are formed in the axial direction; and a plurality of plungers which are enclosed into the plurality of plunger chambers so as to be freely reciprocated by being applied with pressures of return springs and are driven by the cam surface upon relative rotation of both of the input and output shafts.

A plurality of intake ports and discharge ports which function as intake valves and discharge valves in dependence on the positional relation with intake and discharge holes communicated with the plunger chambers on the rotor side are formed on the surface of the rotary valve. Communicating grooves for communicating the discharge ports on the surface of the rotary valve are formed on the back surface thereof. A lid member is closely adhered to the communicating holes on the back surface.

The rotary valve has a mechanism for forcedly opening the intake and discharge holes of the plunger in the intake step to the intake port and also forcedly opening the intake and discharge holes of the plunger in the discharge step to the discharge port even in any case where the relative rotating direction of both shafts is set to the forward or reverse rotating direction.

Further, opening and closing timings of the rotary valve are determined so as to forcedly open the intake port before the discharge step of the plunger is finished. Thus, a high pressure doesn't act on the plunger at a timing near the end of the discharge step when a contact surface pressure rises. Therefore, the contact surface pressure of the plunger decreases and the local abrasions of the cam and the plunger can be prevented.

On the other hand, since a high pressure doesn't act on the plunger at a timing which is slightly before the timing when the plunger rides over the cam, even if the cam is obliquely come into contact with the plunger, a large rotational force is not generated to the plunger and the plunger doesn't rotate.

Further, since the rotary valve has a structure such that communicating groove for communicating the discharge ports on the front surface of the valve are formed on the back surface thereof and the lid member is closely adhered to the communicating grooves to thereby close the back surface, an oil leakage of the valve portion can be reduced.

That is, a high pressure portion which is opened to the front surface of the valve is set to only the discharge port and only the communicating grooves are opened to the back surface of the valve. Therefore, for both of the front and back surfaces of the valve, the oil pressures to open the valve are smaller than the oil pressure in the plunger chamber and an adhesion of the valve portion is held.

Therefore, an oil leakage of the rotary valve is reduced and a torque fluctuation due to a temperature change can be reduced. Further, since the front and back surfaces of the valve are sealed, a length in the axial direction for sealing is unnecessary and a length of joint is not so long.

On the other hand, even in the case where a width of each communicating groove on the back surface of the valve must be made thin, by distributing and arranging the communicating grooves to a plurality of orifices for generating flow resistances, the path from the discharge port to the orifice can be reduced, so that an increase in torque due to an increase in oil viscosity at low temperatures can be decreased.

The hydraulic power transmission joint of the invention has an accumulator for sealing an oil into the joint and absorbing a volume change of the sealed oil.

In the accumulator, a piston for the accumulator has a ring shape, an outer diameter portion of the piston is concentrically attached to a rotary member on the cam side so as to be movable in the axial direction, a inner diameter portion of the piston is extended to a rotary member on the rotor side and is concentrically attached thereto so as to be relatively rotatable and be movable in the axial direction. A sealing member for sealing in the axial direction is provided in the outer diameter portion of the piston. A sealing member for sealing in the rotating direction and the axial direction between the rotary member on the rotor side and the sealing member is provided in the inner diameter portion.

Therefore, a piston area of the accumulator can be increased, so that the dimension in the axial direction of the piston of the accumulator and the dimension of the outer diameter can be reduced and the apparatus can be miniaturized.

A plurality of springs to press the accumulator piston are fixed by a retainer. The retainer is directly caulked and fixed to the housing on the cam side. Therefore, a fixing part such as a snap ring or the like is unnecessary and the length is reduced. On the other hand, by providing a plurality of return springs of the accumulator piston, a load is uniformly applied to the piston. Even if the piston is made thin, it is not inclined. Further, since there is used a structure such that a plurality of springs are caulked and fixed to the retainer, the springs can be easily assembled and there is no need to form spring holding holes in the accumulator piston and a light weight can be realized.

Further, according to the invention, since the oil injection hole is formed so as to be opened to the valley bottom portion of the cam, the oil injection and the air bleeding upon oil injection can be easily executed without increasing the size of joint and reducing the torque capacity.

When the contact surface pressure between the cam and the plunger exceeds an allowable limit, a gall occurs in the contact portion, so that the transmission torque capacity of the joint is determined by such a gall. The contact surface pressure is largest at the top of the cam and is smallest in the valley bottom portion of the cam in dependence on the relation of the cam shape. Therefore, if an oil injection hole of a diameter such that the contact surface pressure is not higher than the contact surface pressure in the cam top portion is opened to the valley bottom portion in which the contact surface pressure is lowest, no gall occurs in the valley bottom portion. That is, the torque capacity does not decrease.

The cam has a predetermined thickness in order to assure a strength of cam and to couple the torque transmission parts and has a space enough to form an oil injection hole having a screw portion for the plug. Thus, even if the oil injection hole is formed in the cam, the joint doesn't increase in size.

On the other hand, when the joint is put so that the cam is located at the top position upon oil injection, the oil injection hole is located in almost the top portion of the oil chamber. Therefore, the air bleeding can be easily performed upon oil injection and no air is mixed when the plug is attached after the oil was injected.

The above and other objects, features, and advantages of the present invention will become more apparent from the following detailed description with reference to the drawings.

BRIEF DESCRIPTION OF THE DRAWINGS

FIG. 13C is an explanatory diagram showing a comparison between the opening and closing timings of the intake port by the rotary valve in FIGS. 2A and 12;

DETAILED DESCRIPTION OF THE PREFERRED EMBODIMENTS

Figure 1:
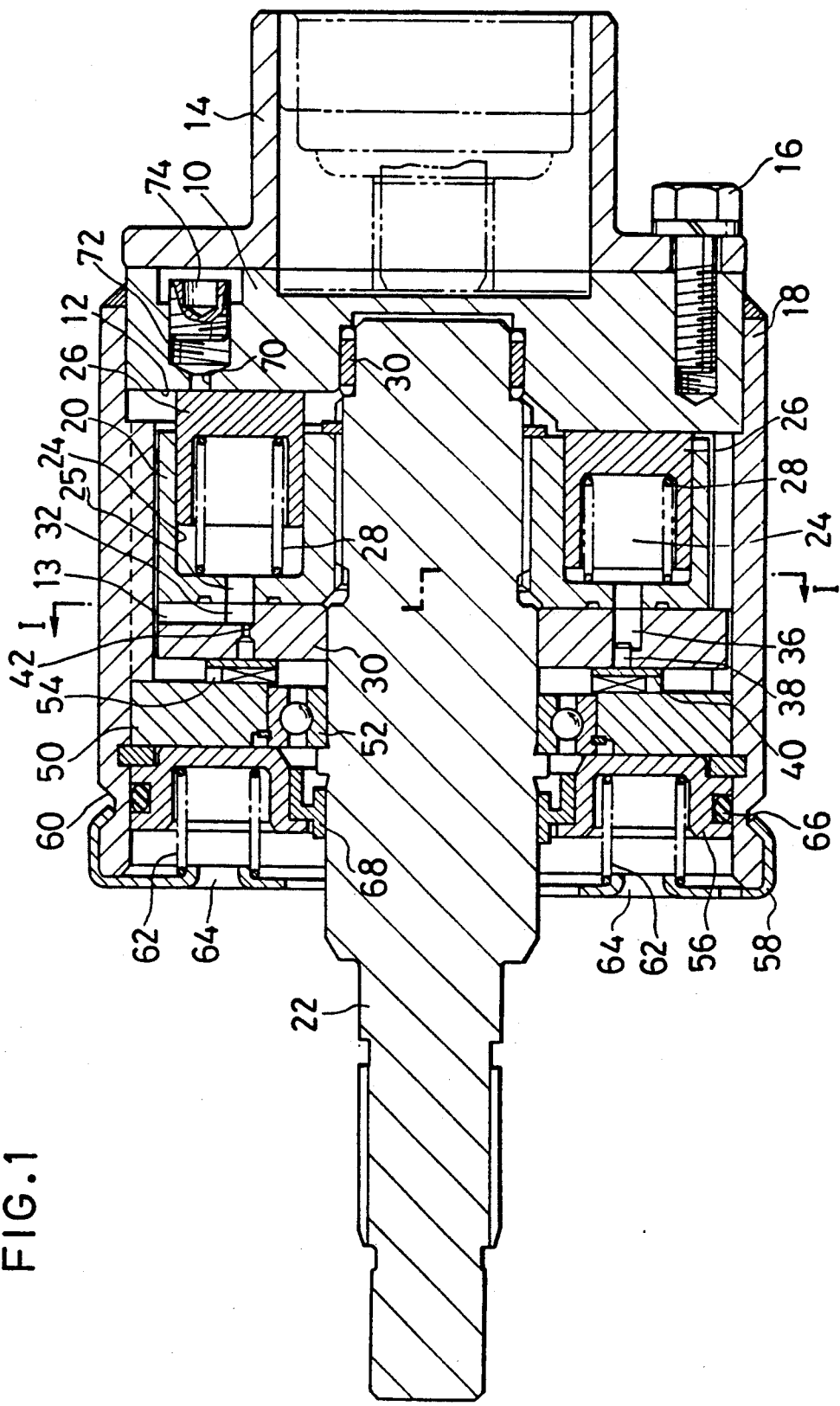
FIG. 1 is a cross sectional view showing an embodiment of the present invention.

FIG. 1 is a cross sectional view showing an embodiment of the invention.

In FIG. 1, reference numeral 10 denotes a cam. A cam surface 12 having two or more mountains is formed on the inside edge surface of the right edge of the cam 10. For instance, four cam mountains and cam valleys are alternately formed on the cam surface 12. The cam 10 is coupled with an output shaft 14 by a bolt 16 and rotates integratedly with the output shaft 14. The cam 10 is fixed to a cam housing 18 by welding. The cam housing 18 rotates integratedly with the cam 10.

Reference numeral 20 denotes a rotor which is rotatably enclosed in the cam housing 18. The rotor 20 is coupled with an input shaft 22 and rotates integratedly with the input shaft 22.

A plurality of plunger chamber 24 are formed in the rotor 20 in the axial direction. Assuming that the number of cam mountains of the cam 10 is set to four, for instance, seven plunger chambers 24 are formed at regular intervals. A plunger 26 is slidably enclosed in each of the plunger chambers 24 through a return spring 28. An intake/discharge hole 25 is formed in the bottom portion of the plunger chamber 24.

Figure 2:
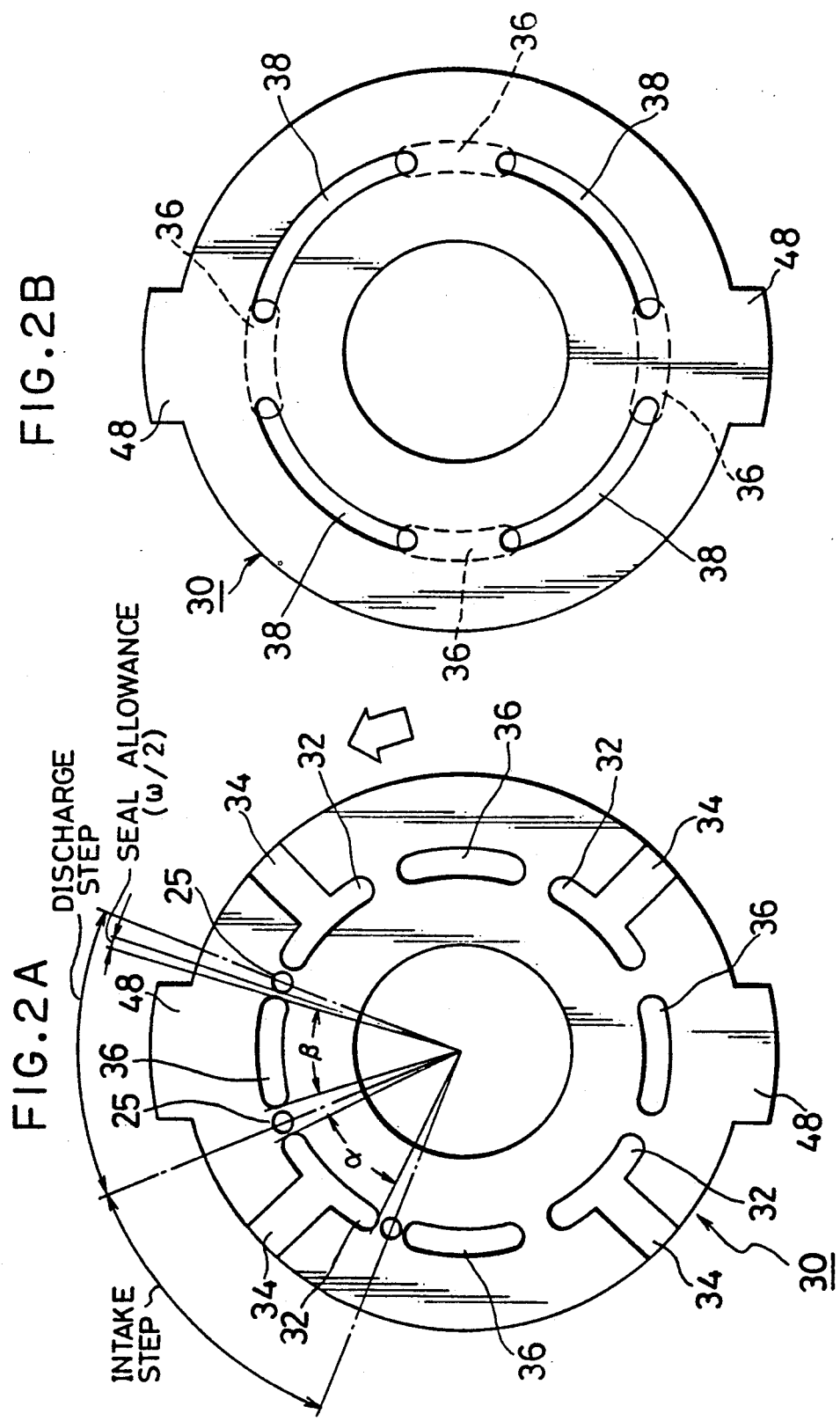
FIG. 2A is an explanatory diagram on the front surface side of a rotary valve in FIG. 1.
FIG. 2B is an explanatory diagram on the back surface side of the rotary valve in FIG. 1.

Reference numeral 30 denotes a rotary valve. As shown in FIG. 2A, intake ports 32 and discharge ports 36 are alternately formed at four positions on the surface locating on the side of the rotor 20, respectively. An intake passage 34 is formed from the outer periphery and coupled with each intake port 32. As shown in FIG. 2B, communicating grooves 38 for communicating the four discharge ports 36 on the front surface are separately formed at four positions on the back surface of the rotary valve 30.

In FIG. 2A, $\alpha$ denotes an open valve angle of the intake port 32 and $\beta$ indicates an open valve angle of the discharge port 36. FIG. 2A further shows an intake step to form the intake port 32 and a discharge step to form the discharge port 36. Assuming that the number of mountains of the cam 10 is set to $N_c$, a rotational angle of each of the intake and discharge steps is set to $$360°/(2N_c)$$

The open valve angle $\alpha$ of the intake port 32 and the open valve angle $\beta$ of the discharge port 36 are set to $\alpha = 360°/(2N_c) - $ (diameter of intake/discharge hole) $-$ (seal allowance)

$\beta = 360°/(2N_c) - $ (diameter of intake/discharge hole) $-$ (seal allowance)

Now, assuming that the seal allowance is set to $\omega$, it is given as an interval between both edges of the port in the case where the intake/discharge hole 25 was virtually located on a boundary line between the discharge and intake steps as shown in the diagram.

Returning again to FIG. 1, a lid member 40 is closely adhered to opening portions of the communicating grooves 38 formed on the back surface of the rotary valve 30. Further, an orifice 42 to generate a flow resistance is formed between the communicating groove 38 on the back surface of the valve body 30 and the intake port 32 on the front surface. In the embodiment, the orifice 42 is formed at one position in the left upper intake port 32 as shown in FIG. 3.

Figure 3:
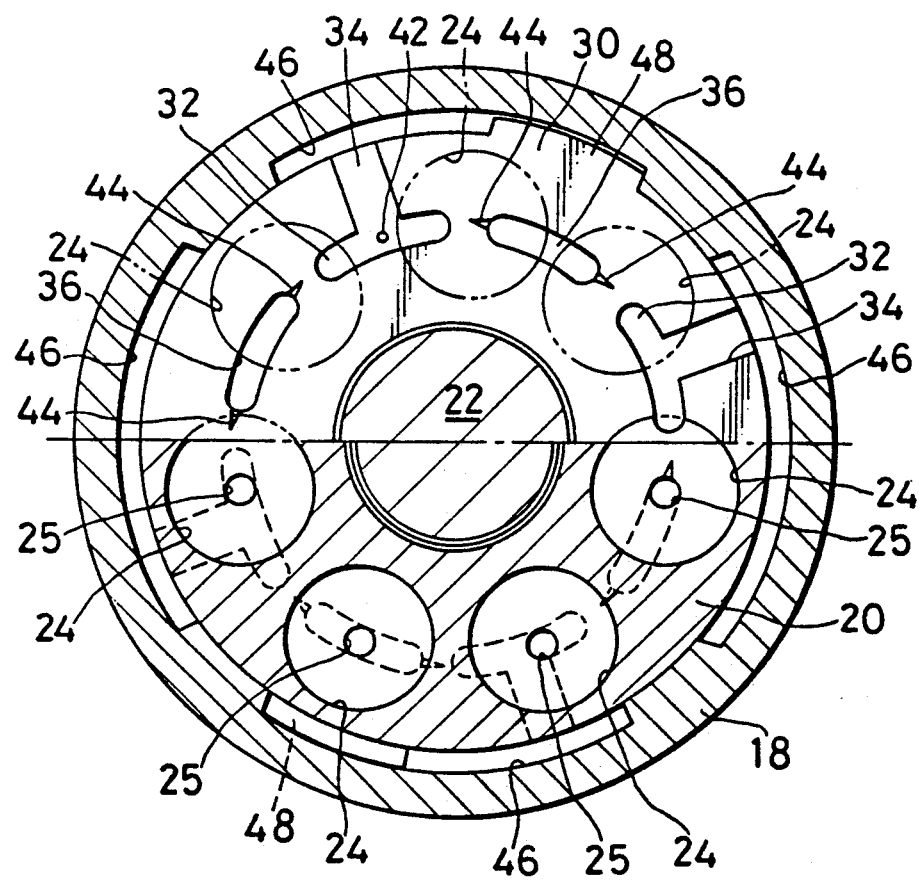
FIG. 3 is a cross sectional view taken along the line I—I in FIG. 1.

FIG. 3 shows a cross sectional view taken along the line I—I in FIG. 1. The upper half portion in FIG. 3 shows a cross section when it is seen from the surface of the valve body 30 of the rotary valve. The lower half portion shows a cross section in the case where the valve body side is cut in the bottom portion of the plunger chamber 24 of the rotor 20 and the valve body side is seen.

In FIG. 3, the intake ports 32 and the discharge ports 36 are alternately formed at four positions on the circumference which face the cam mountains on the surface of the rotary valve 30, respectively. The four intake ports 32 are opened to the inside (low pressure portion) of the cam housing 18 of the outer periphery by the intake passages 34. The four discharge ports 36 are mutually communicated by the communicating grooves 15 on the back surface. Mustache-like notches 44 are formed at both edges of the discharge port 36. The notches 44 are formed because of the following reasons.

Since the intake port 32 and the discharge port 36 are not short-circuited even in the case where the intake/discharge hole 25 of the rotor 20 exists between them, an interval between the ports 32 and 36 is set to a predetermined length, thereby providing a seal allowance. Therefore, in the case where the rotor 20 rotates and the intake/discharge hole 25 is located between the ports 32 and 36, the oil in the plunger chamber 24 is pushed out by the plunger 26 which is still in the discharge step. However, a closed state without an exit occurs and an opposite action such that the oil pressure in the plunger chamber 24 rises and an abnormal torque is generated. Therefore, by forming the notches 44, a slight leakage between the discharge port 36 and the intake port 32 is permitted, thereby preventing the occurrence of the complete closed state and reducing the generation of the abnormal torque.

The discharge port 36 is formed in the rotary valve 30 in a manner such that a value which is obtained by adding the half value of a total area $S_{s1}$ of seal lands around the discharge port 36 to a total area $S_{v1}$ of the discharge ports 36 on the valve surface is smaller than a total area $S_p$ of the liquid pressure acting areas of the plunger chambers 26 in the discharge step.

The communicating groove 38 is formed on the rotary valve 30 in a manner such that a value which is obtained by adding the half value of a total area $S_{s2}$ of seal lands around the communicating groove 38 to a total area $S_{v2}$ of the communicating grooves on the valve back surface is smaller than the total area $S_p$ of the liquid pressure acting areas of the plunger chambers 26 in the discharge step.

As will be clearly understood from an explanation hereinlater, the oil leakage from the rotary valve 30 can be minimized by forming the discharge ports 36 and the communicating grooves 38 as mentioned above.

The rotary valve 30 has positioning projections 48 which come into engagement with notches 46 formed at four positions on the inner peripheral surface of the cam housing 18.

The notches 46 of the cam housing 18 and the projections 48 of the rotary valve 30 construct a positioning mechanism for determining opening/closing timings and phase relations among the intake/discharge holes 25, the intake ports 32, and the discharge ports 36 irrespective of the rotating direction when a relative rotation occurs between the input shaft 22 and the output shaft 14.

Assuming that the number of mountains of the cam is set to $N_c$, an angle $\theta$ at which the projection 48 can rotate for the notch 46, that is, a rotatable angle $\theta$ of the rotary valve 30 is set to $$\theta = 360°/(2 \times N_c) - (\text{seal allowance}/2)$$

The seal allowance in the above equation will be explained hereinlater.

Figure 4:
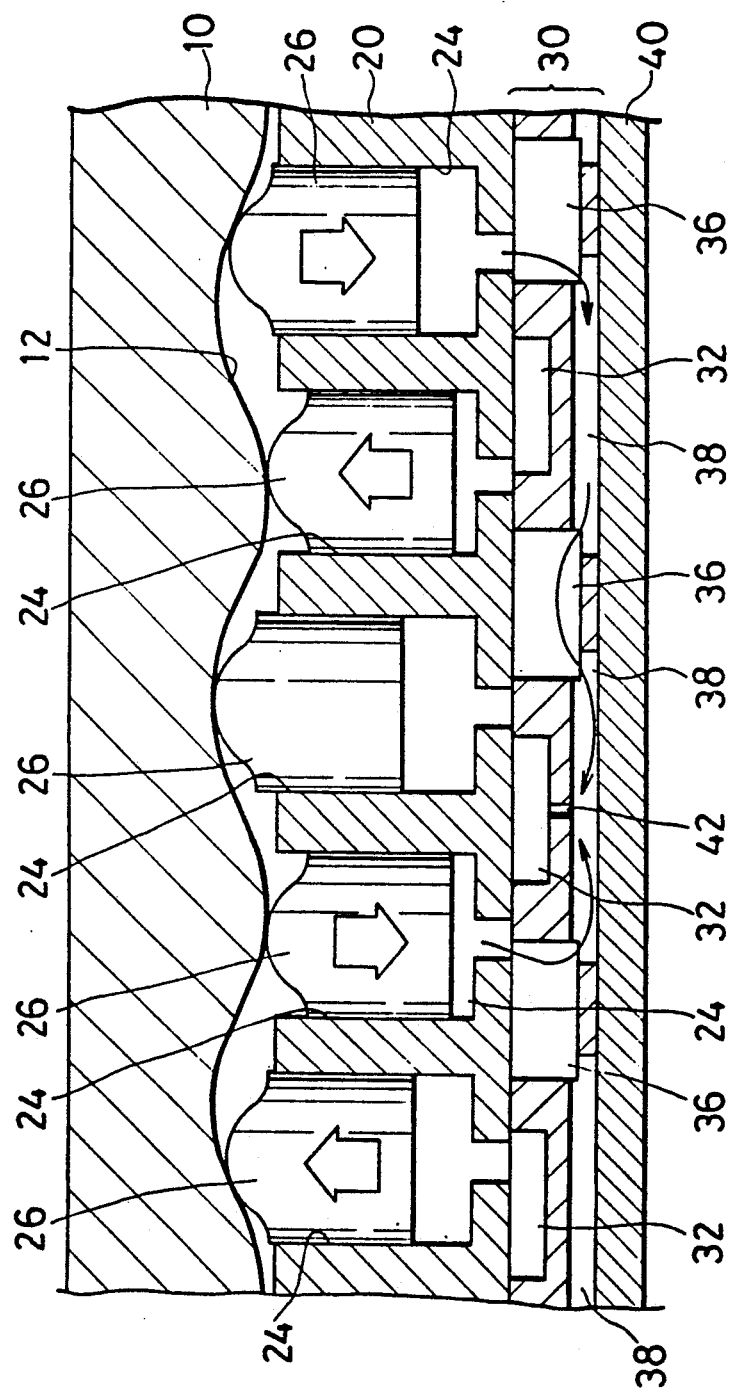
FIG. 4 is an explanatory diagram showing the motion of a plunger due to the relative rotation of a cam and a rotor in FIG. 1 by developing such a motion as a straight line.

Explaining in more detail, as will be obviously understood from FIG. 4 which shows the cam 10 and the rotor 20 in FIG. 1 by developing on a straight line, when the plunger 26 is in the intake step, there is obtained a positional relation such that the intake port 32 of the rotary valve 30 is communicated with the intake/discharge hole 25 of the plunger chamber 24. The oil can be injected from an intake passage 13 into the plunger chamber 24 through the intake/discharge hole 25 of the rotor 20.

On the contrary, when the plunger 26 is in the discharge step, a positional relation opposite to that in the intake step is derived. Namely, the intake/discharge hole 25 of the plunger chamber 24 formed in the rotor 20 is communicated with the communicating groove 38 on the back surface via the discharge port 36 of the rotary valve 30.

The intake and discharge steps of the plunger 26 as mentioned above alternately occur as shown in FIG. 4 with respect to the seven plungers 26. The discharge side is communicated with the intake side via the orifice 42 of the rotary valve 30. Therefore, a pressure corresponding to the flow resistance of the orifice 42 is generated on the discharge side. A torque is transferred between the cam 10 and the rotor 20.

Returning to FIG. 1, reference numeral 50 denotes a thrust block which rotates integratedly with the cam housing 18 and supports the input shaft 22 through a bearing 52. A needle bearing 54 is interposed between the thrust block 50 and the lid member 40 which is closely adhered to the communicating grooves 38 of the rotary valve 30. A friction torque on the side of the needle bearing 54 is set so as to be smaller than a friction torque between the rotor 20 and the rotary valve 30.

Therefore, when the direction of the relative rotation between the input shaft 22 and the output shaft 14 changes, the rotary valve 30 rotates together with the rotor 20. Thus, as shown in FIG. 3, the rotary valve rotate until the positioning projection 48 of the rotary valve 30 which abuts on the right edge of the notch 46 of the cam housing 18 is come into contact with the left edge of the notch 46 of the cam housing 18. After that, the rotary valve 30 rotates integratedly with the cam housing 18. Due to this, even when the relative rotating direction is set to any one of the forward and reverse rotating directions, the intake/discharge hole 25 can be opened or closed by the rotary valve 30 always at a predetermined timing.

Referring again to FIG. 1, reference numeral 56 denotes an accumulator piston which is provided in the cam housing 18 so as to be slidable in the axial direction. On the outside of the accumulator piston 56, an edge portion of a retainer 58 is caulked and fixed to an outer peripheral groove 60 of the cam housing 18. A plurality of return springs 62 are interposed between the retainer 58 and the accumulator piston 56. A plurality of caulking holes 64 are formed in the retainer 58. One end of the return spring 62 is caulked and fixed to the inside of the caulking hole 64. Therefore, there is no need to support the return spring on the side of the accumulator piston 56.

The accumulator piston 56 is pressed by a plurality of return springs 62. The edge portion of the retainer 58 to hold the return springs 62 is caulked and fixed to the outer annular groove 60 of the cam housing 18. Thus, there is no need to use a washer and a snap ring, the number of parts can be reduced, and a length of joint can be decreased because of the decrease in number of unnecessary parts.

Since a plurality of return springs 62 are used, a load is uniformly applied to the accumulator piston 56. Even if the accumulator piston 56 is made thin, it is not inclined.

Figure 8:
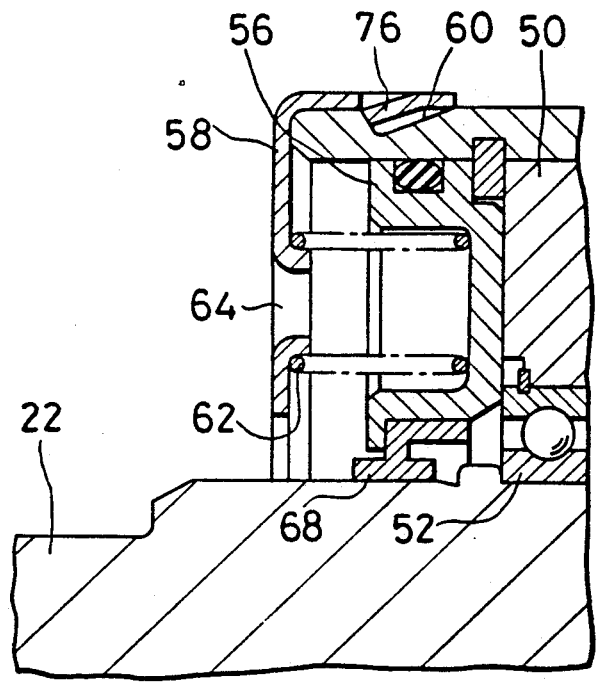
FIG. 8 is a cross sectional explanatory diagram showing another example of a caulking structure of a retainer for an accumulator piston to the cam housing.

As shown in FIG. 8, a caulking structure of the edge portion of the retainer 58 to the annular groove 60 of the cam housing 18 can be realized by bending notches 76 formed at a plurality of positions.

An O ring 66 is attached to the outer diameter portion of the accumulator piston 56. The inner diameter portion of the piston 56 is extended onto the input shaft 22. An oil seal 68 is interposed between the inner diameter portion of the accumulator piston 56 and the input shaft 22. Since the inner diameter portion of the accumulator piston 56 is extended onto the input shaft 22 and the oil seal 68 is interposed as mentioned above, a piston area of the accumulator piston 56 is enlarged and a specified capacity can be obtained by a short stroke. The piston can be reduced in the axial direction.

Figure 5:
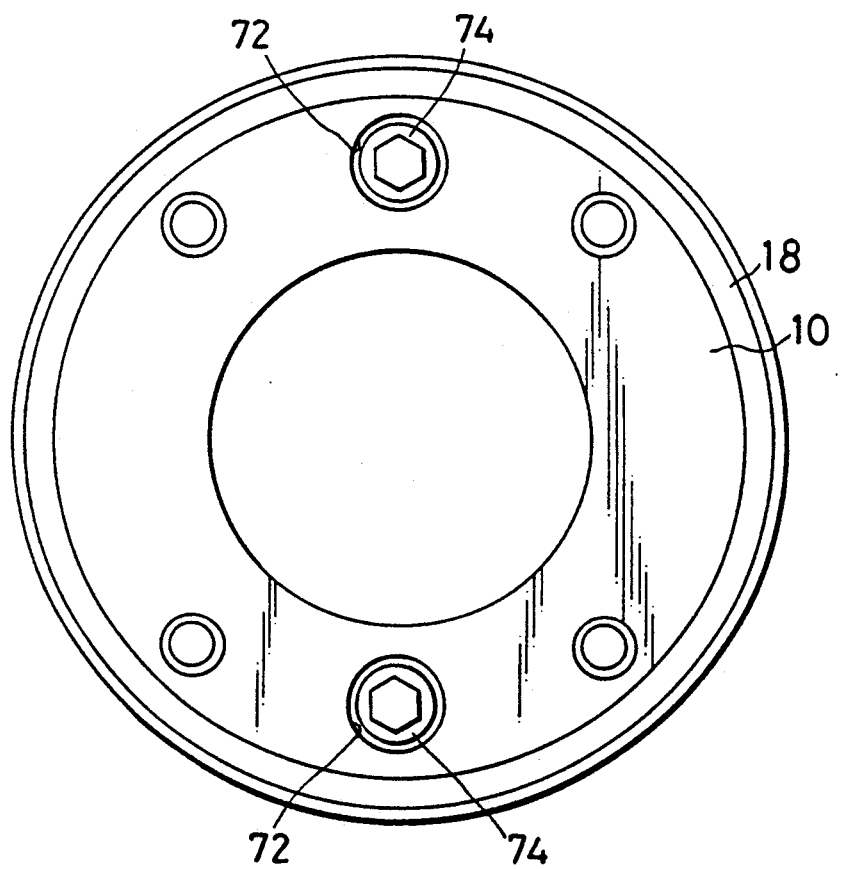
FIG. 5 is an explanatory diagram of an oil injection structure of an edge surface of a cam housing in FIG. 1.

An oil injection hole 70 is opened to the valley bottom portion of the cam surface of the cam 10 and is communicated with the low pressure chamber side in the joint. A tapered screw hole 72 is formed subsequent to the oil injection hole 70. A tapered plug 74 is screwed into the tapered screw hole 72. The tapered screw hole 72 into which the tapered plug 74 was screwed is formed at two positions as shown in an edge surface diagram of the cam 10 in FIG. 5, so that the communicating holes 70 are opened in the valley bottom portion at two positions of the cam surface 12.

Upon oil injection, the oil is injected from one of the oil injection holes 72 and is discharged from the other hole, thereby executing the air bleeding. After completion of the oil injection, the tapered plugs 74 are screwed into the tapered screw holes 72, thereby sealing. The reason why the oil injection holes 70 are opened to the cam valley bottom portion is as follows.

First, when a contact surface pressure between the cam 10 and the plunger 26 exceeds an allowable limit, a gall occurs in the contact portion and a torque capacity of the joint is decided by the gall.

Figure 6:
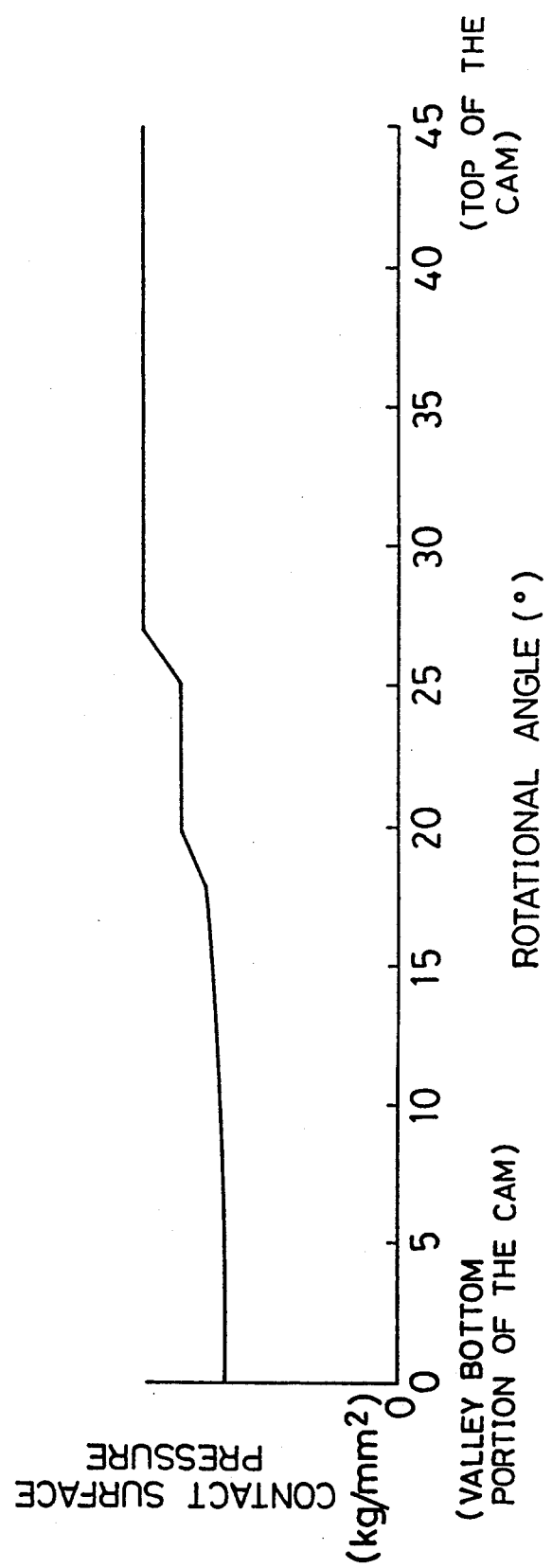
FIG. 6 is a characteristic diagram of a contact surface pressure of the plunger to a rotational angle of the cam when an oil injection hole is not opened in the valley bottom portion of the cam.
Figure 7:
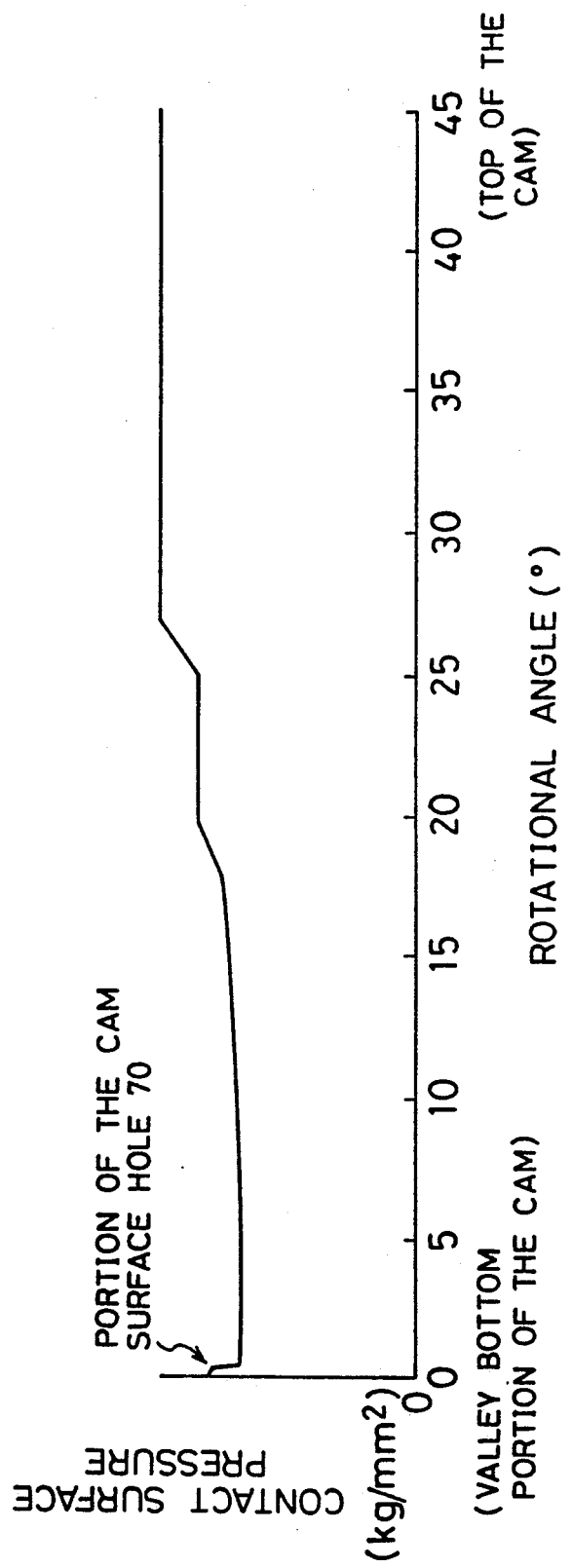
FIG. 7 is a characteristic diagram of the contact surface pressure of the plunger to the rotational angle of the cam when an oil injection hole is opened in the valley bottom portion of the cam in the invention.

In the case where the cam surface 12 has no hole, as shown in FIG. 6, the contact surface pressure is largest in the top portion of the cam and is smallest in the valley bottom portion of the cam. Therefore, by forming the oil injection holes 70 in the valley bottom portion of the cam in which the contact surface pressure is smallest, as shown in FIG. 7, although the contact surface pressure of the oil injection hole portion is higher than that in the case where no hole is formed, it is set to be lower than the contact surface pressure of the cam top portion, so that the torque capacity of the joint doesn't decrease.

On the other hand, the cam 10 has a predetermined thickness to assure a cam strength and to couple with the torque transmitting portion and fundamentally has an allowance enough to form the oil injection holes 70. Therefore, even if the oil injection holes 70 are formed in the cam 10, the size of joint is not increased.

When the cam 10 is set to the upper position upon oil injection, the oil injection hole 70 is located in almost the top portion of the low pressure chamber in the joint. Therefore, the air bleeding can be easily performed upon oil injection. When the tapered plug 74 is inserted after completion of the oil injection, there is no fear of mixture of the air.

The operation of the embodiment of FIG. 1 will now be described.

When no rotational speed difference occurs between the cam 10 and the rotor 20, the plunger 26 doesn't stroke and the torque is not transferred. At this time, the plunger 26 is pressed onto the cam surface 12 by the return spring 28.

Then, when a rotational speed difference occurs between the cam 10 and the rotor 20, the plunger 26 is pressed in the axial direction (to the left in the diagram) by the cam surface 12 of the cam 10 in the case of paying an attention to one plunger 26 in the discharge step.

At this time, since the intake/discharge hole 25 of the plunger chamber 24 is communicated with the discharge port 36 of the rotary valve 30, the plunger 26 pushes out the oil in the plunger chamber 24 from the intake/discharge hole 25 to the discharge port 36 of the rotary valve 30.

The oil which was pushed out to the discharge port 36 passes through the communicating groove 38 on the back surface and the orifice 42 and is supplied to the intake port 32. At this time, the oil pressures in the communicating groove 38, discharge port 36, and plunger chamber 24 rise due to a resistance of the orifice 42, so that a reaction is generated in the plunger 26. A torque is generated by rotating the cam 10 against the reaction force of the plunger 26. The torque is transferred between the cam 10 and the rotor 20. Since each discharge port 36 is communicated by the communicating groove 38, the oil pressures in all of the plunger chambers 24 in the discharge step are equal.

When the cam 10 further rotates, the intake step is started and the plunger 26 is pressed and returned toward the valley bottom portion of the cam surface 12 by the return spring 28. In the intake step, since the intake/discharge hole 25 of the plunger chamber 24 is communicated with the intake port 32, the oil in the intake passage 34 is injected into the plunger chamber 24 via the intake port 32 and intake/discharge hole 25. The plunger 26 is returned along the cam surface 12 of the cam 10.

A stroke state of a plurality of plungers 26 in association with the relative rotation between the cam 10 and the rotor 20 is as shown in FIG. 4 when it is developed on a straight line. The oil from the plunger chamber 24 in the discharge step passes through the discharge port 36 and the communicating groove 38 and is supplied to the orifice 42 as shown by arrows.

Figure 9:
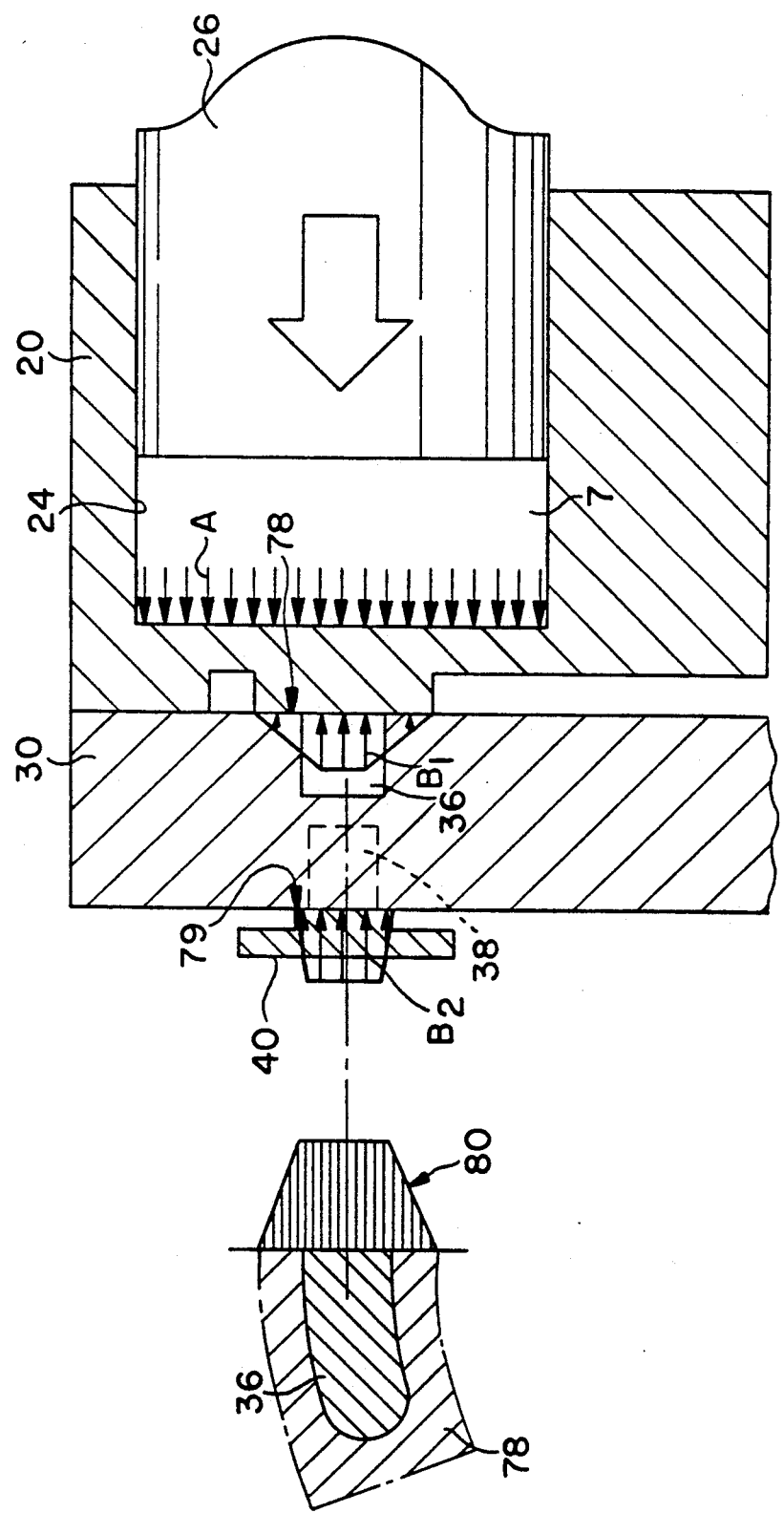
FIG. 9 is a explanatory diagram showing a force which acts on the rotary valve in FIG. 1.

A rotor pressing force A which acts on the rotor 20 by the liquid pressure is as shown in FIG. 9 and is obtained by the following equation.

$$A = P \times S_p \ldots \quad (1)$$

P: discharge pressure
$S_p$: total area of the plunger chambers 24 in the discharge step On the other hand, a hydraulic reaction force $B_1$ of the front surface of the valve and a hydraulic reaction force $B_2$ of the back surface of the valve which act on the rotary valve 30 are obtained by the following equations. In FIG. 9, reference numeral 80 denotes a pressure distribution.

$$B_1 = P(S_{v1} + S_{s1}/2) \ldots \quad (2)$$

$$B_2 = P(S_{v2} + S_{s2}/2) \ldots \quad (3)$$

Figure 10A:
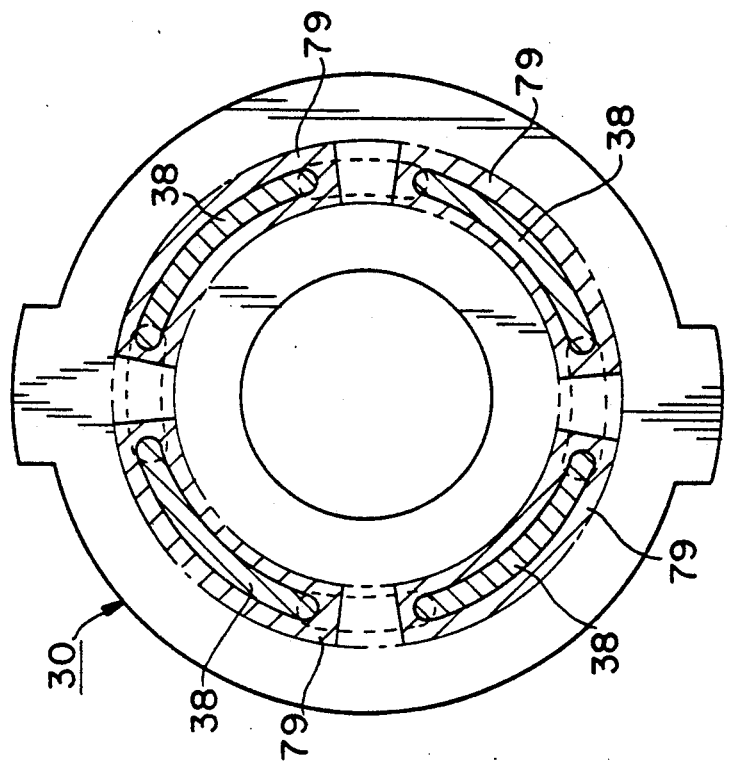
FIG. 10A is an explanatory diagram showing a liquid pressure acting area of the front surface of the rotary valve.
Figure 10B:
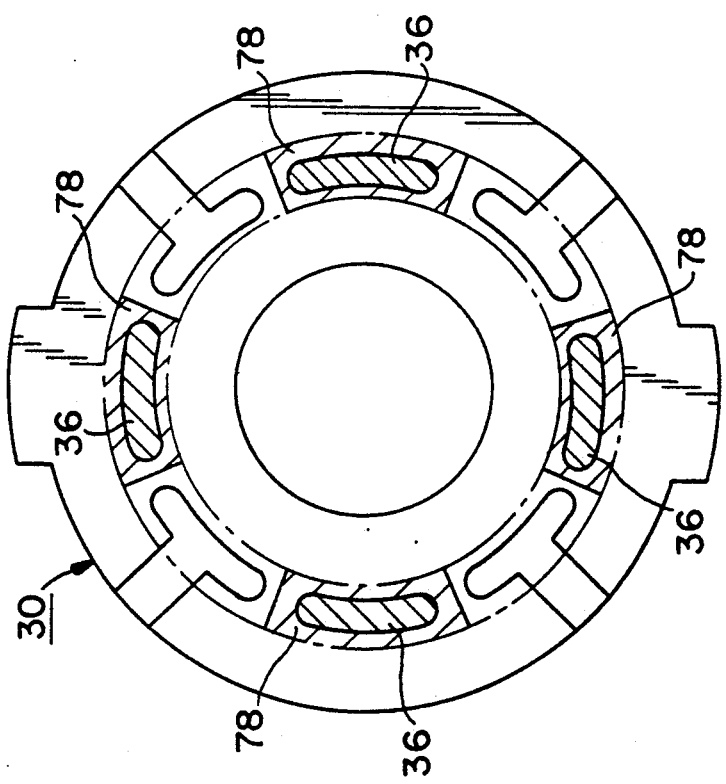
FIG. 10B is an explanatory diagram showing a liquid pressure acting area of the back surface of the rotary valve.

$S_{v1}$: total area of the discharge ports 36
$S_{s1}$: total area of the surface seal lands 78
$S_{v2}$: total area of the communicating grooves 38
$S_{s2}$: total area of the seal lands 78 of the back surface In FIGS. 10A and 10B, hatched portions show the seal lands 78 and 79 with respect to the front and back surfaces of the rotary valve 30 shown in FIGS. 2A and 2B.

The discharge ports 36 and the communicating grooves 38 are formed so as to satisfy the following relations.

$$S_p > (S_{v1} + S_{s1}/2)$$

$$S_p > (S_{v2} + S_{s2}/2)$$

Therefore, the valve surface hydraulic reaction forces $B_1$ and $B_2$ in the equations (2) and (3) on the front and back surfaces of the rotary valve 30 which intend to open the close adhesion of the valve portion are smaller than the rotor pressing force A in the equation (1), so that the close adhesion of the rotary valve 30 is held.

Thus, the oil leakage of the rotary valve 30 decreases and a torque fluctuation due to a temperature change can be reduced. On the other hand, since the front and back surfaces of the rotary valve 30 are sealed, a length in the axial direction for sealing is unnecessary and a length of joint is not increased.

Figure 11:
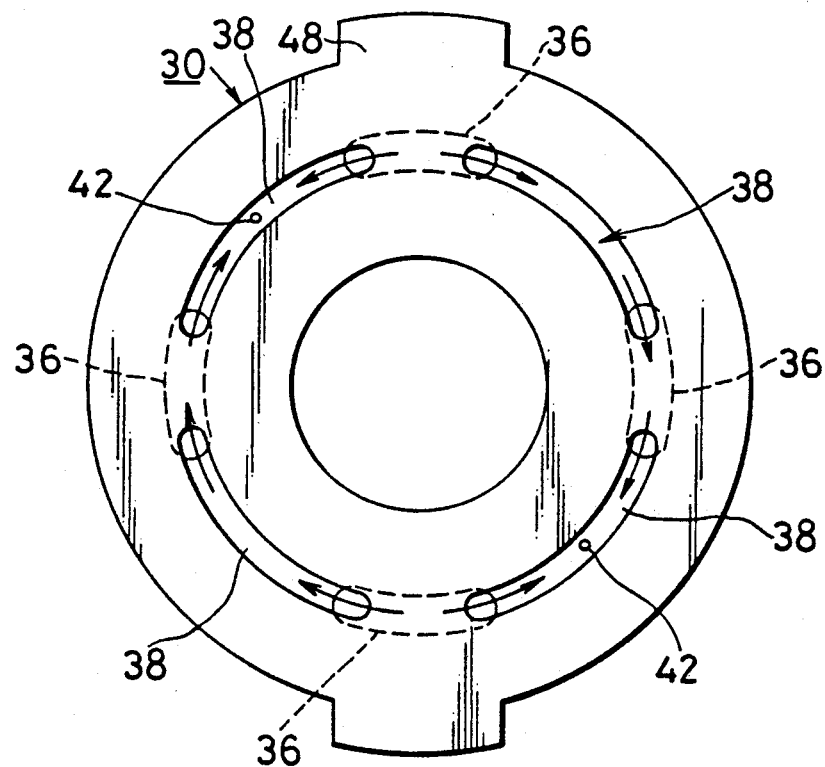
FIG. 11 is an explanatory diagram of a rotary valve having two orifices.

Further, in the case of making the communicating groove 38 on the back surface of the rotary valve 30 thin in order to reduce the hydraulic reaction force of the valve surface, as shown in FIG. 11, by distributing and arranging the orifices 42 at two positions, a length of passage from the discharge port 36 to the orifice 42 can be reduced and an increase in torque due to an increase in oil viscosity at low temperatures can be decreased.

Moreover, since the orifice 42 is communicated between the communicating groove 38 formed on the back surface of the rotary valve 30 and the intake port 36 formed in the front surface of the rotary valve, the joint can be easily worked.

Figure 12:
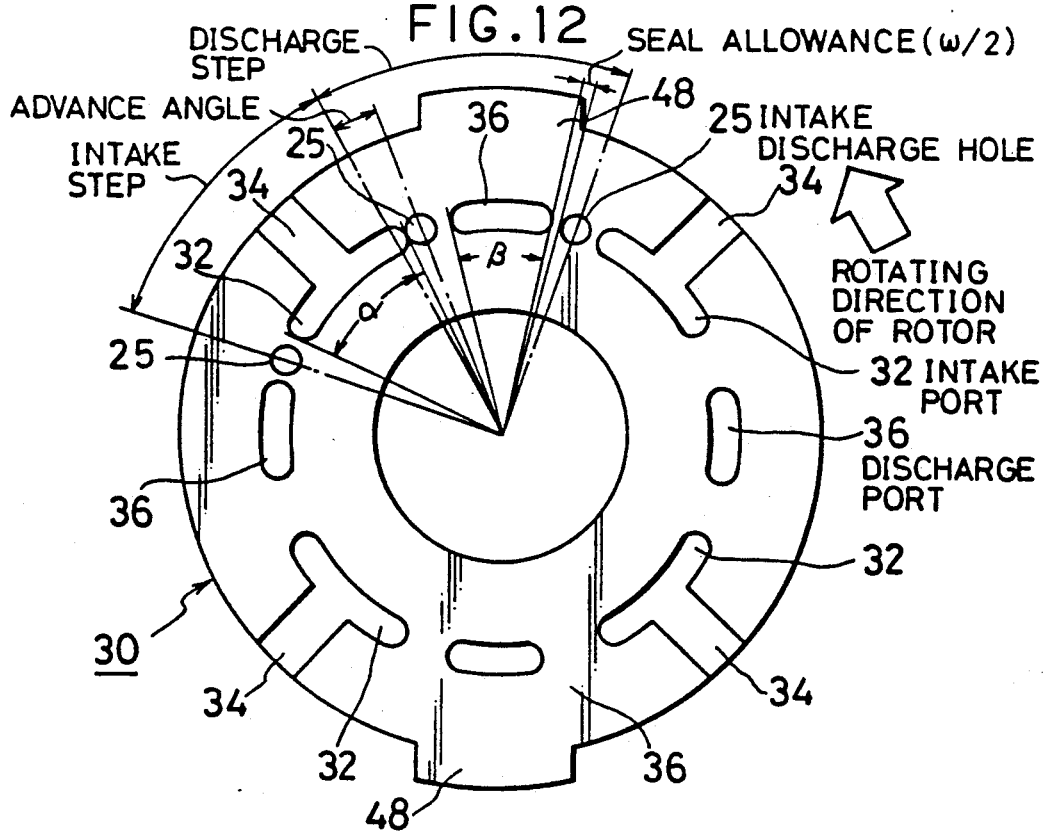
FIG. 12 is an explanatory diagram of a rotary valve having a port shape which makes a timing to open an intake port early.

FIG. 12 is an explanatory diagram of a valve surface showing another embodiment of the rotary valve 30 which is used in the invention. The embodiment is characterized in that the intake/discharge hole 25 is forcedly opened to the intake port 32 before the discharge step of the plunger 26 is finished.

Practically speaking, the open valve angle $\alpha$ of the intake port 32 is larger than the open valve angle $\beta$ of the discharge port 36. The rotational angle of the rotary valve 30 to the cam housing 18 is also smaller than that in the case where an intake advance angle doesn't exist.

That is, the open valve angle $\alpha$ of the intake port 32 and the open valve angle $\beta$ of the discharge port 36 are set to $\alpha = 360°/(2N_c) + (advance\ angle) - (diameter\ of\ intake/discharge\ hole) - 0.5(seal\ allowance)$ $\beta = 360°/(2N_c) - (advance\ angle) - (diameter\ of\ intake/discharge\ hole) - 1.5(seal\ allowance)$ The seal allowance is obtained by virtually locating the intake/discharge hole 25 as shown on a boundary line of the substantial intake and discharge steps whose angles were advanced.

Figure 13A:
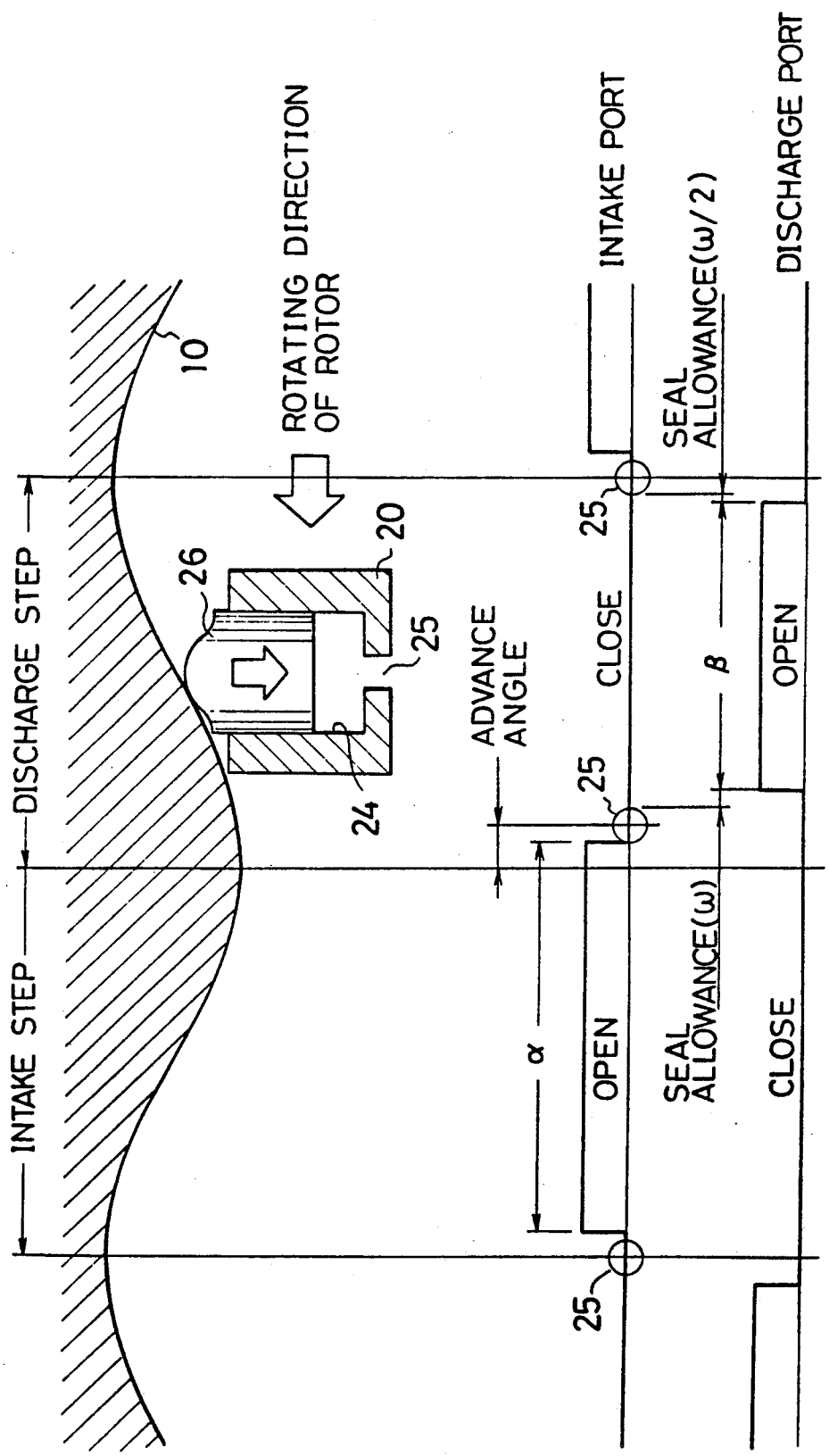
FIG. 13A is an explanatory diagram showing opening and closing timings of the valve in the case where an advance angle exists.

FIG. 13A shows opening/closing timings of the intake port 32 and the discharge port 36 for the intake and discharge steps of the plunger 26 in the case where the rotor 20 was moved in a fixed state of the cam 10 and in the case where the rotary valve 30 in FIG. 12 was used.

Figure 13B:
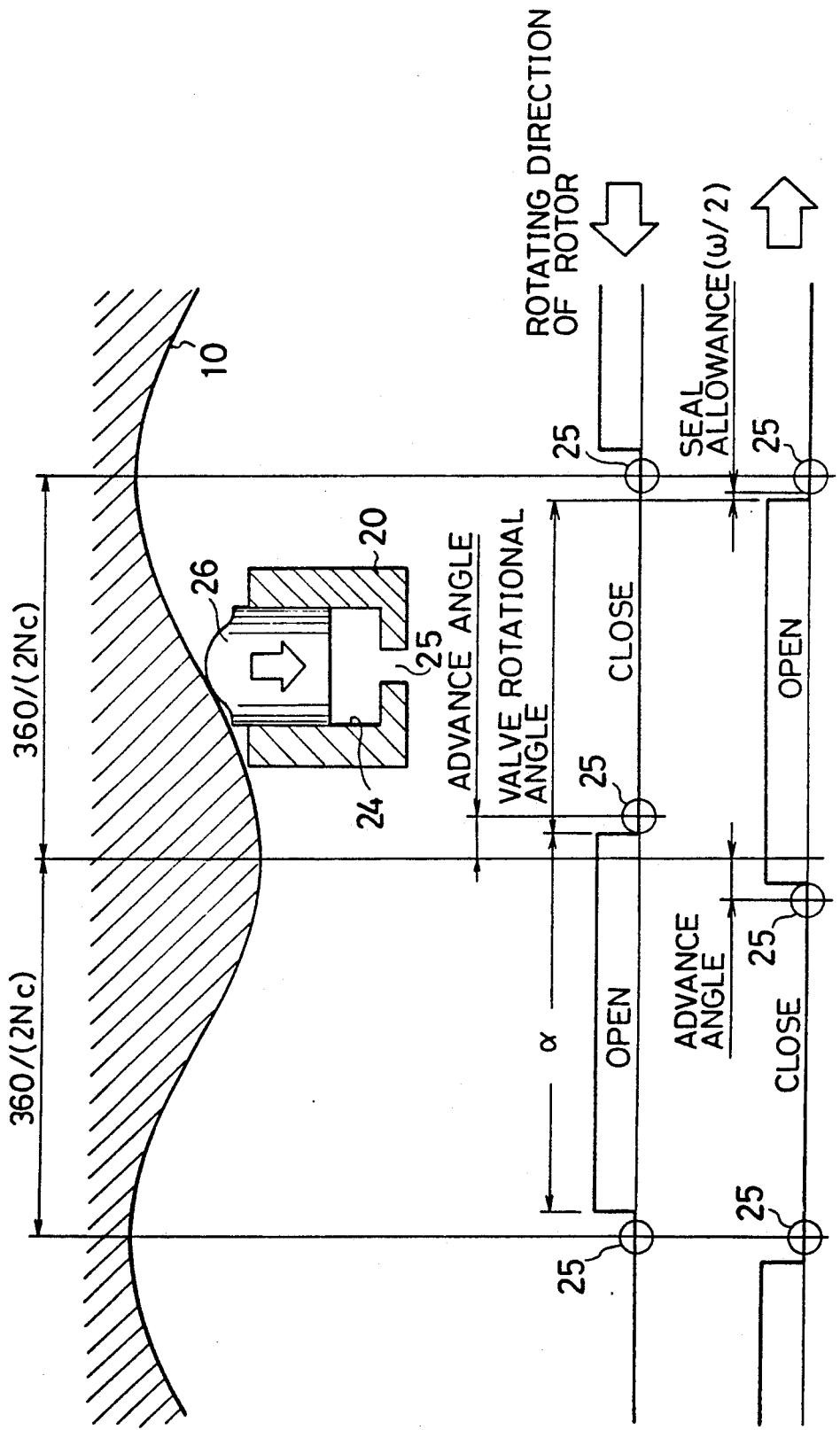
FIG. 13B is an explanatory diagram showing opening and closing timings of the valve when the rotating direction is switched in the case where an advance angle exists.

FIG. 13B shows opening/closing timings when the intake/discharge hole 25 is opened to the intake port 32 in the case where the rotating direction of the rotor 20 was changed for FIG. 13A.

Further, FIG. 13C shows a comparison of the opening/closing timings of the intake port 32 by the rotary valves shown in FIGS. 12 and 2A.

As will be obviously understood from FIG. 13C, in the case of FIG. 12, the intake port 32 is opened before the plunger 26 finishes the discharge step as compared with the opening/closing timings in FIG. 2A.

The reason why the intake port 32 is forcedly opened before the discharge step is finished is as follows.

Figure 14:
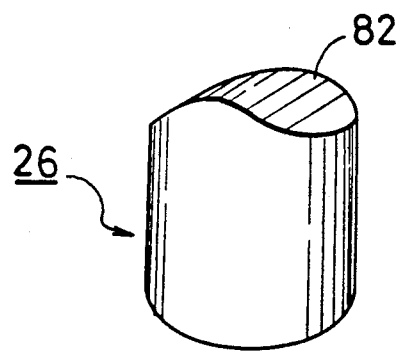
FIG. 14 is a perspective view showing an example of a plunger which is used in the invention.

First, as shown in FIG. 14, the plunger 26 in FIG. 1 is constructed in a manner such that a shape of a front edge portion 82 of the plunger 26 is set into an arc or elliptic shape in the sliding direction with the cam surface 12 and is set into a straight line shape in the direction perpendicular to such a sliding direction. A shape of the cam surface 12 is set to a shape which is formed by the plunger when the plunger 26 executes a predetermined stroke motion in association with the rotation of the cam.

Figure 15A:
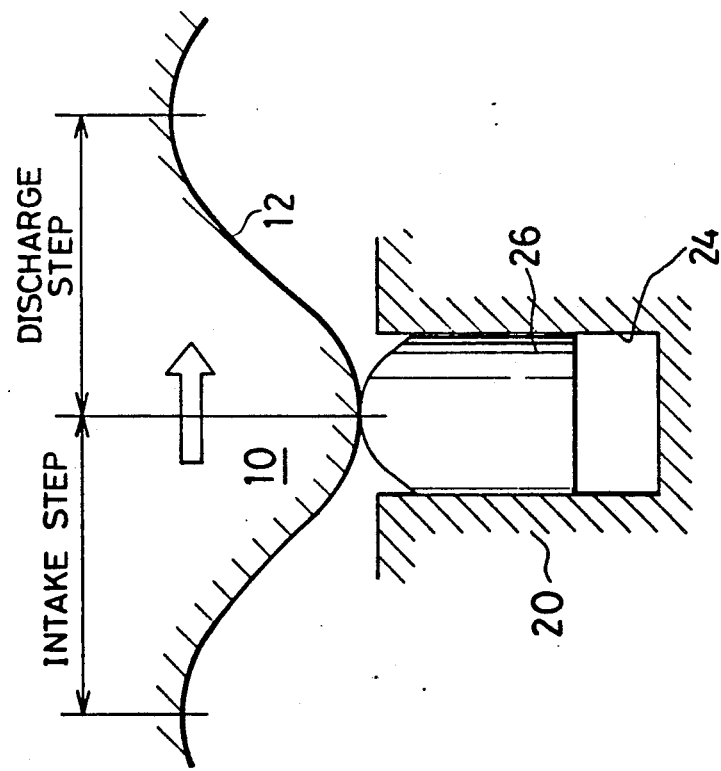
FIG. 15A is an explanatory diagram of an oblique contact state of the plunger at the end of the discharge step.
Figure 15B:
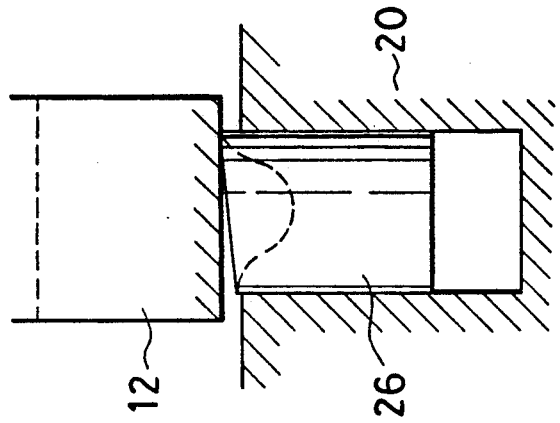
FIG. 15B is a side elevational explanatory diagram of an oblique contact state of the plunger at the end of the discharge step.

However, in the case of using such a cam surface 12 and a plunger 26, as shown in FIG. 15A, when the plunger 26 rides over the mountain portion of the cam 10 at the bottom dead point corresponding to the last point of the discharge step, the cam surface 12 comes into contact with the plunger 26 in an oblique contact state as shown in FIG. 15B due to a problem on accuracy.

Figure 16:
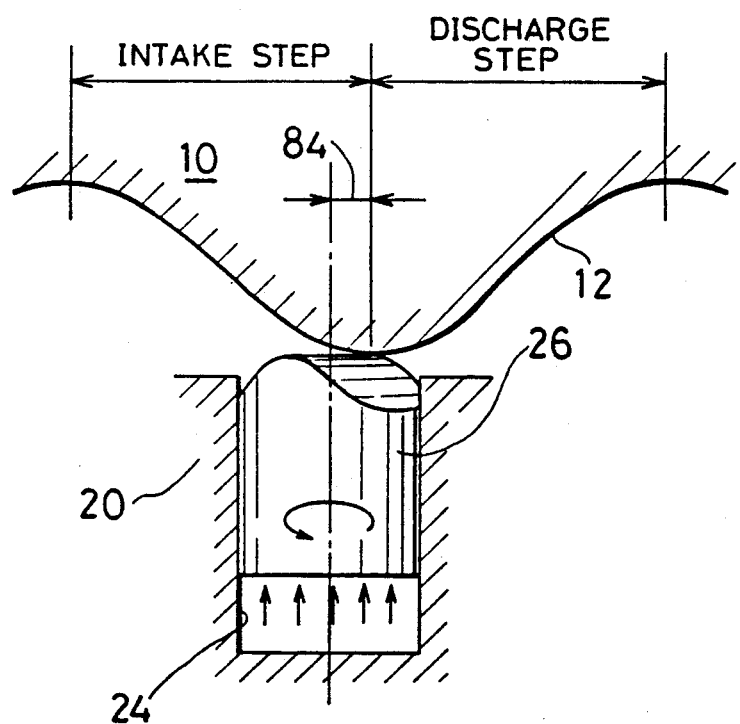
FIG. 16 is an explanatory diagram of the rotation by an oblique contact of the plunger and a timing delay.

Further, at this time point, since a high pressure in the discharge step acts on the plunger 26, the plunger 26 is strongly pressed onto the cam surface 12. The plunger 12 rotates as shown in FIG. 16 owing to the double operations of such an oblique contact state and the pressing force. After completion of the discharge step, the cam surface 12 slightly rotates and the plunger 26 can now ride over the mountain portion of the cam surface 12. Thus, a timing delay 84 occurs.

Since the intake port 32 is closed during such a period of time, a high pressure is held in the plunger chamber 24.

The moment the plunger 26 subsequently rode over the mountain portion of the cam surface 12, the plunger 26 is strongly returned by the high pressure held in the plunger chamber 24 and violently collides with the cam surface 12. Thus, not only a large noise is generated but also the contact portions of the cam surface 12 and the plunger 26 are deformed and are abnormally abraded.

Therefore, by using the rotary valve 30 in FIG. 12, the intake port 32 is forcedly opened before the discharge step of the plunger 26 is finished. The high pressure of the plunger 26 is released at a timing near the end of the discharge step in which the contact surface pressure rises, thereby reducing the contact surface pressure and preventing the local abrasion of the cam surface 12 and the plunger 26 and the generation of the noise. Even if the plunger 26 is obliquely come into contact with the cam surface 12, since a large rotational force is not applied to the plunger 26, the rotation can be prevented.

What is claimed is:

1. A hydraulic power transmission joint which is used in a vehicle in which two power transmission shafts are relatively rotatably coupled and when a rotational speed difference occurs between said two shafts, a torque corresponding to said rotational speed difference is transferred, comprising:

- a cam housing which is coupled to on of said two shafts and in which a cam surface having two or more mountains is formed on an inside surface;
- a rotor which is coupled to the other one of the shafts and is rotatably enclosed in said cam housing and in which a plurality of plunger chambers are formed in an axial direction;
- a plurality of plungers which are reciprocatingly movably enclosed into said plurality of plunger chambers by being applied with pressures of return springs and are reciprocated by the cam surface upon relative rotation of said two shafts;
- a plurality of intake/discharge holes for respectively communicating the plunger chambers with an edge surface of said rotor;
- rotary valve means which rotatably comes into sliding contact with the edge surface of the rotor and is positioned so as to have a predetermined relation with the cam housing and in which a plurality of intake ports and discharge ports which act as intake valves and discharge valves in dependence on the positional relation with the intake/discharge holes are alternately formed on a front surface of the rotary valve means and, further, a plurality of communicating grooves for communicating said discharge ports are formed on a back surface of the rotary valve means;
- a lid member which is closely adhered to the communicating groove portion on the back surface of the rotary valve means; and
- orifice means which is arranged between the communicating grooves of the rotary valve means and a low pressure side and generates a flow resistance.

2. A joint according to claim 1, wherein an orifice hole is pierced and formed as said orifice means between the communicating groove and the intake port.

3. A joint according to claim 1, wherein a plurality of orifice holes are pierced and formed as said orifice means between the communicating groove and the intake port.

4. A joint according to claim 1, further having an opening/closing timing setting mechanism for opening the intake/discharge holes of a group of said plunger chambers in an intake step to the intake ports of the rotary valve means and for opening the intake/discharge holes of another group of said plunger chambers in a discharge step to the discharge ports of the rotary valve means in the case where a direction of the relative rotation of both of said shafts is set to any one of forward and reverse rotating directions.

5. A joint according to claim 4, wherein said opening/closing timing setting mechanism has:
- projections formed on an outer peripheral surface of the rotary valve; and
- notched grooves which are formed on the cam housing and rotatably support said projections in a range of an arrangement angle θ of said plurality of plunger chambers,
- and wherein a friction torque between the rotary valve means and the cam housing side is set to be smaller than a friction torque between the rotary valve means and the rotor, and the rotary valve means is rotated integratedly with the cam housing after the position of the rotary valve means was rotated by only the angle θ of said notched grooves in accordance with the direction of the relative rotation of both of said shafts.

6. A joint according to claim 1, wherein the rotary valve means is constructed in a manner such that the intake port is widened to the discharge step side so as to open the intake/discharge hole of the plunger chamber to the intake port before a discharge step is finished.

7. A joint according to claim 6, wherein the rotary valve means is constructed in a manner such that when the intake/discharge hole of the plunger chamber is located between the intake port and the discharge port, the intake port is widened to the discharge step side so as to obtain specified sealing portions among the intake/discharge hole and the intake and discharge ports locating on both sides of said intake/discharge hole.

8. A joint according to claim 1, further having an accumulator for sealing an oil into the joint and for absorbing a volume change of said sealing oil.

9. A joint according to claim 8, wherein said accumulator is constructed in a manner such that a piston has a ring shape and an outer diameter portion of said piston is enclosed into the cam housing through first sealing means for sealing in an axial direction and an inner diameter portion of the piston is rotatably attached to a rotary shaft of the rotor side so as to be movable in the axial direction through second sealing means for sealing in the axial and rotating directions.

10. A joint according to claim 8, wherein said accumulator has a plurality of springs for pressing the piston and a retainer for holding and fixing said springs, and wherein said retainer is directly fixed to an outer cylinder portion of the cam housing.

11. A joint according to claim 1, wherein an oil injection hole which is opened from an outside is formed in a valley bottom portion of the cam.

* * * * *